Patented Aug. 14, 1951

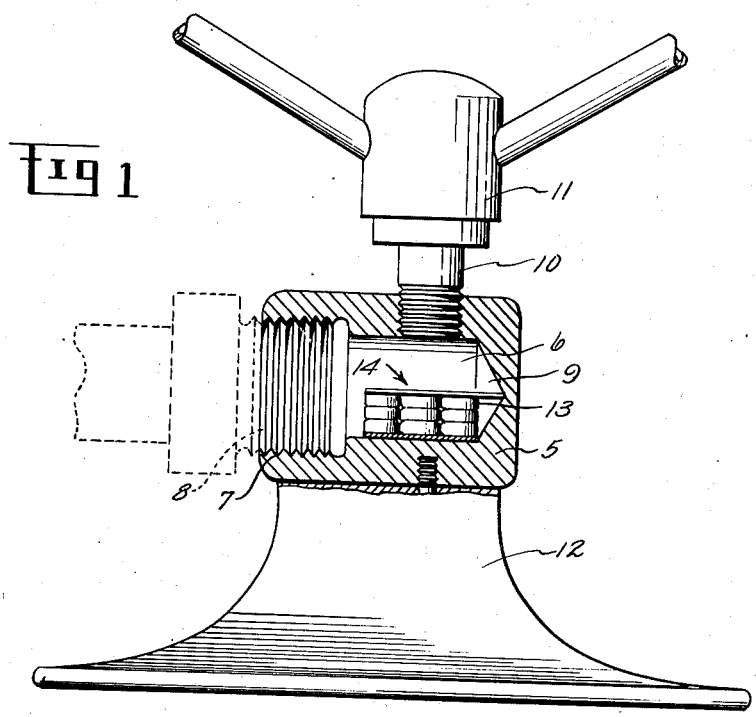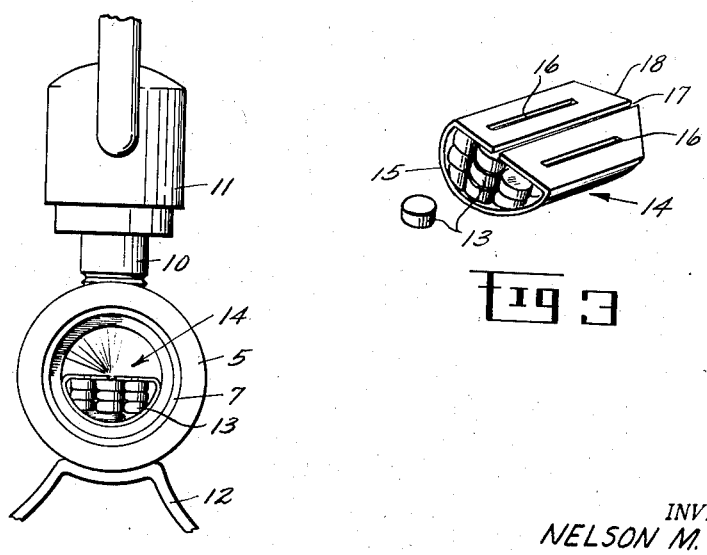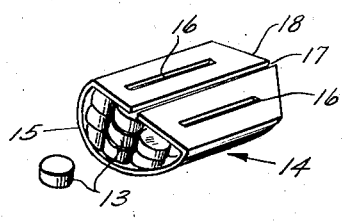

2,563,961

UNITED STATES PATENT OFFICE 2,563,961

APPARATUS FOR APPLYING FERTILIZER TO LAWNS

Nelson M. Rieger, Miamisburg, Ohio, assignor to The Rieger Manufacturing Company, Miamisburg, Ohio, a corporation of Ohio Application October 16, 1946, Serial No. 703,633

7 Claims. (Cl. 299—83)

This invention relates to apparatus for applying fertilizer to lawns and other areas.

One object of the invention is to provide a simple easily performed method of distributing fertilizer or the like over a desired area in a highly effective manner.

A further object of the invention is to provide means whereby a fertilizer may be introduced into the water flowing through a lawn sprinkler and distributed with the water over the sprinkled area.

A further object of the invention is to provide means whereby a soluble solid may be inserted in the flow chamber of a sprinkler and retained therein until completely dissolved by the water flowing through said chamber.

A further object of the invention is to provide a container for a soluble solid which can be easily inserted in the flow chamber and removed therefrom when the solid has been dissolved.

Other objects of the invention may appear as the device is described in detail.

In the accompanying drawings Fig. 1 is a side elevation, partly in section and partly broken away, of a lawn sprinkler showing the invention applied thereto; Fig. 2 is an end elevation of such a sprinkler; and Fig. 3 is a detail view of a container for the solids.

In these drawings I have illustrated one embodiment of the invention and have shown the same as applied to a lawn sprinkler of a well known type, but it is to be understood that the invention may take various forms and may be applied to sprinklers or water distributing devices of various kinds. It is also to be understood that the invention may be used for distributing materials other than fertilizer, such for example as insecticides.

The sprinkler here shown comprises a body 5 having therein a longitudinal cylindrical bore 6 which constitutes a flow chamber and is provided at one end with means whereby that chamber may be connected with a source of water under pressure, as by internal screw threads 7 adapted to receive a coupling member 8 on the hose. In the sprinkler here shown the end wall of the body 5 at that end of the flow chamber opposite the inlet end has formed therein a tapered recess 9, which is formed by the boring implement. The flow chamber is connected through a suitable outlet with a sprinkler or the like, which is here shown as of the rotatable type, and includes a tubular stem 10 mounted in an opening on the upper portion of the body 5 and on which is rotatably supported a spray head 11. The body may rest upon the ground but usually it is provided with a supporting structure, such as that shown at 12.

The fertilizer, in the form of a solid, is inserted in the flow chamber in a position in which a part of the water flowing through the flow chamber will move in contact with the fertilizer and slowly dissolve the same, the dissolved fertilizer mingling with the water and the mixture being discharged from the spray head. Means are provided for retaining the solid fertilizer in the chamber until it has been substantially completely dissolved and for preventing solid particles thereof, of substantial size, from passing through the sprinkler head.

The soluble solid may be in any suitable form but preferably it is in the form of compressed tablets 13 each of which contains a substantial amount of fertilizer and dissolves slowly in the water. It is also preferable that the tablet shall be flat in order that a plurality of them may be stacked in a relatively small space.

To facilitate the insertion of the tablets in the flow chamber and for retaining the same therein I have provided a container 14 adapted to receive a plurality of tablets and which is easily inserted in and removed from the flow chamber through the inlet end of the latter. This container may be formed of any suitable material which is water resistant and will not readily disintegrate in water and is here shown as formed from a thin strip of brass. The container may be of any suitable shape but preferably it is substantially semi-cylindrical in form, the curved lower portion 15 thereof conforming substantially to the contour of the lower portion of the flow chamber, and the upper or substantially flat wall thereof being spaced from the outlet for the flow chamber and being provided with small openings, such as narrow slits 16, through which the water and dissolved fertilizer may pass to the spray head. The ends of the container are here shown as open but obviously closures may be provided for these ends so long as there are sufficient openings for the water to enter the container. By omitting the end closures the container may be formed by bending a strip of material to the desired shape and may thus be produced at a low cost. Preferably the material is resilient and the initial diameter of the container is slightly greater than the diameter of the flow chamber so that the container must be slightly compressed before it can be inserted in the flow chamber and will then expand into firm contact with the wall of the chamber. The end portions of the strip which form the top wall of the container are of such width that when the container has been inserted in the flow chamber the edges of these parts will be spaced a slight distance one from the other, thus providing an additional narrow outlet as shown at 17. The ends of the top wall opposite the inlet are slightly tapered and extend beyond the body of the container as shown at 18 so that they enter the tapered recess 9 at the inner end of the chamber and thus properly locate the container in the chamber and assist in holding the same against movement. It is not essential that the tablets shall be firmly held in the container because the end wall of the flow chamber will prevent them escaping from one end of the container and the incoming water will prevent them from escaping from the other end of the container. However, in the arrangement shown the spacing between the resilient top wall and the curved lower wall is such that the tablets will be engaged and gripped by the top wall when stacked in the container in the contemplated manner.

When the fertilizer is to be placed in the flow chamber the latter is disconnected from the hose, the container filled with tablets and placed in the flow chamber. When the tablets have been completely dissolved the flow chamber is again disconnected from the hose, the container removed, refilled, and again inserted. However, if desired the container may be formed of very inexpensive material in which the tablets may be packed to form a cartridge ready for insertion into the chamber, such a cartridge of course being provided at its ends with means for retaining the tablets therein. Thus the fertilizer may be sold in cartridges and the containers discarded after the fertilizer therein has been exhausted.

When the fertilizer is in the form of compressed tablets as above described a substantial number thereof may be placed in the container and the rate of dissolution will be relatively slow, the fertilizer of course being highly concentrated so that this slow disintegration of the tablets will provide the proper amount of fertilizer to the water passing through the spray head. One charge of tablets will be sufficient for fertilizing a plurality of areas such as are covered by the sprinkler and the sprinkler, after having remained in one position the desired length of time, can be readily moved to another position by a pull on the hose. It will be apparent that the dissolved fertilizer will be completely mingled with the water and will be uniformly distributed over the entire area covered by the sprinkler.

While I have shown and described one embodiment of my invention, I wish it to be understood that I do not desire to be limited to the details thereof as various modifications may occur to a person skilled in the art.

Having now fully described my invention, what I claim as new and desire to secure by Letters Patent, is:

1. A sprinkler comprising a body having means whereby it may be supported on a lawn, having therein a substantially horizontal and substantially cylindrical flow chamber and having in the upper portion thereof an opening, said flow chamber being closed at one end and having at its other end an inlet adapted to be connected with a hose, a spray head supported on said body and having open communication with said flow chamber through said opening, and a container for soluble solid material in said flow chamber, said container having a bottom wall conforming to the contour of and supported on the lower portion of the wall of said flow chamber, having one end thereof in open communication with said inlet and having a substantially flat perforated top wall below and spaced from said opening.

2. A sprinkler comprising a body having means whereby it may be supported on a lawn, having therein a substantially horizontal and substantially cylindrical flow chamber and having in the upper portion thereof an opening, said flow chamber being closed at one end and having at its other end an inlet adapted to be connected with a hose, a spray head supported on said body and having open communication with said flow chamber through said opening, and a container for soluble solid material in said flow chamber, said container having a bottom wall conforming to the contour of and supported on the lower portion of the wall of said flow chamber, having one end thereof in open communication with said inlet and having a resilient perforated top wall below and spaced from said opening and adapted to grip said solid material and retain the same in said container.

3. A sprinkler comprising a body having means whereby it may be supported on a lawn, having therein a substantially horizontal flow chamber and having in the upper portion thereof an opening, said flow chamber being closed at one end and having at its other end an inlet adapted to be connected with a hose, a spray head supported on said body and communicating with said flow chamber through said opening, and a container for soluble solid material in said flow chamber, said container being formed of thin resilient material, being substantially semi-cylindrical in cross section and having an initial diameter slightly greater than the diameter of said flow chamber, whereby it grasps the wall of said flow chamber, said container having one end thereof in open communication with said inlet and having a foraminous top wall below and spaced from said opening and arranged to grip the solid material in said container.

4. A container for supporting soluble solid material in the flow chamber of a self supported lawn sprinkler of the type having a horizontal flow chamber, means for connecting the inlet end of said chamber with a hose, and an outlet communicating with the upper portion of said chamber; said container comprising a shell of thin material adapted to be inserted in said chamber through the inlet end thereof, and having a lower wall to engage and be supported on the lower wall of said chamber, and also having a perforated upper wall spaced from said lower wall such a distance that when inserted in said flow chamber it will be positioned below and in spaced relation to said outlet, one end of said shell being open for communication with said inlet.

5. A container for supporting soluble solid material in the flow chamber of a self supported lawn sprinkler of the type having a horizontal and substantially cylindrical flow chamber, means for connecting the inlet end of said chamber with a hose, and an outlet communicating with the upper portion of said chamber; said container comprising a shell of thin material adapted to be inserted in said chamber through the inlet end thereof and having an arcuate lower wall conforming substantially to the curvature of the lower portion of the wall of said chamber and a perforated upper wall, said shell being of such height that when inserted in said chamber said upper wall will be spaced from said outlet, and one end of said shell being open to receive water from said inlet.

6. A container for supporting soluble solid material in the flow chamber of a self supported lawn sprinkler of the type having a horizontal and substantially cylindrical flow chamber, means for connecting the inlet end of said chamber with a hose, and an outlet communicating with the upper portion of said chamber; said container comprising a shell of thin material adapted to be inserted in said chamber through the inlet end thereof and having an arcuate lower wall conforming substantially to the curvature of the lower portion of the wall of said chamber and a perforated resilient upper wall arranged to exert retaining pressure on the material in said shell, said shell being of such height that when inserted in said chamber said upper wall will be below and spaced from said outlet, and one end of said shell being open to receive water from said inlet.

7. A container for supporting soluble solid material in the flow chamber in a self supported lawn sprinkler of the type having means whereby the inlet to the flow chamber may be detachably connected with a hose and having a spray head connected with the outlet of said flow chamber; said container comprising a hollow shell of a size and shape to be inserted in and removed from said flow chamber through said inlet and to be removably supported on a wall of said chamber, said shell having an opening adjacent said inlet when said shell is so supported in said flow chamber, and also having a perforated wall spaced from said opening for communication with said inlet when said shell is supported in said flow chamber.

NELSON M. RIEGER.

REFERENCES CITED

The following references are of record in the file of this patent:

UNITED STATES PATENTS

| Number | Name | Date |
|---|---|---|
| 1,252,510 | Truell | Jan. 8, 1918 |
| 1,532,809 | Girard | Apr. 7, 1925 |
| 1,847,406 | McArdle | Mar. 1, 1932 |
| 1,923,266 | Houpert | Aug. 22, 1933 |
| 2,165,868 | Martin | July 11, 1939 |
| 2,338,615 | Armstrong | Jan. 4, 1944 |

FOREIGN PATENTS

| Number | Country | Date |
|---|---|---|
| 464,244 | Great Britain | Apr. 14, 1937 |